April 7, 1970  R. M. FRAYNE  3,504,432
METAL FORMING METHOD
Filed May 13, 1968  2 Sheets-Sheet 1

INVENTOR:
Robert M. Frayne
BY Gravely, Lieder & Woodruff
ATTORNEYS.

April 7, 1970    R. M. FRAYNE    3,504,432
METAL FORMING METHOD
Filed May 13, 1968                2 Sheets-Sheet 2

INVENTOR:
Robert M. Frayne
BY Gravely, Lieder & Woodruff
ATTORNEYS.

United States Patent Office 3,504,432
Patented Apr. 7, 1970

3,504,432
METAL FORMING METHOD
Robert M. Frayne, St. Louis County, Mo., assignor to Watlow Electric Manufacturing Company, St. Louis, Mo., a corporation of Missouri
Filed May 13, 1968, Ser. No. 728,479
Int. Cl. H05b *3/00;* B21d *22/10*
U.S. Cl. 29—611
8 Claims

ABSTRACT OF THE DISCLOSURE

A method of forming a raised flange around an opening in sheet metal (specifically a metal sheathed resistance heater) by applying forces from one side of the metal which includes applying a first sealing force around the opening a spaced distance therefrom, applying a second force to the lip of the opening, and then forcing a column of extrudable material into the opening while slowly withdrawing the second force so that, as the extrudable material is forced into the opening, it moves beneath the lip of the opening and forces the sheet metal around the opening outwardly to form a flange around the opening.

Background of the invention

In making a particular type of sheathed metal heater, a tubular projection is applied to the outer surface of the heater where the contact or terminal emerges from the heater. An insulating material is packed around the terminal to insulate it from the sheath and the projection. The projection provides protection for the terminal and a more secure anchor to the heater. Heretofore, in applying this tubular projection around an opening in a sheathed metal heater, it has been necessary to drill a hole in the heater and then weld or solder the small tubular metal piece to the outer surface of the heater around the opening. This produces the disadvantage in that there is always a sharp burr left at the inner edge of the drill hole by the drill and this causes electrical failure by short circuiting to the heating element.

It is a principal object of the present invention to obviate this difficulty by forming the column from the sheath metal of the heater around the opening by applying forces to the outer surface of the material, and only a reaction pressure is used against the opposite side of the sheath metal.

It is a further object to provide a method for forming a raised flange around an opening in a sheet metal part wherein only reacting pressures are applied against the back side of the sheet metal part. Thus, it can be seen that the present invention, while particularly suitable for sheath electric heaters, also has more general application.

Summary of the invention

A method of forming a flange around an opening in sheet metal from one side including applying spaced forces to the metal around the opening, extruding a flowable column through the opening beneath the sheet metal and slowly withdrawing the force most closely adjacent to the opening so as to form the sheet metal upwardly, away from the plane of the sheet metal, around the opening.

Description of the drawings

In the accompanying drawings wherein like numbers refere to like parts wherever they occur.

Detailed description

In the following description the process is described as being applied to a metal sheathed electrical resistance heater which is filled with granular magnesium oxide or other packed electrical insulating material, and which normally contains a resistance heating element. This invention is particularly applicable to the continuous method of making sheathed heaters shown in my co-pending application Ser. No. 294,879 of July 15, 1963, now Patent No. 3,402,465, entitled "Electric Heating Units and Methods of Making Same." However, this method also is applicable to forming sheet metal in other applications.

Figure 1:
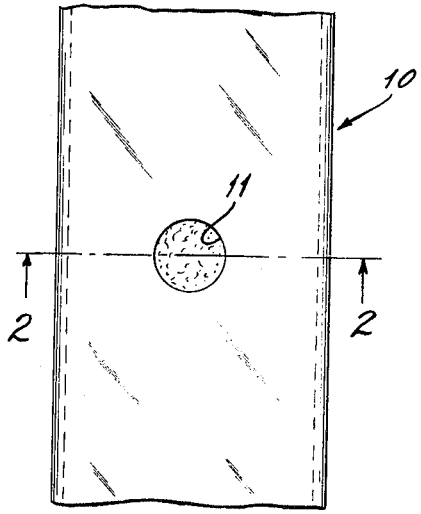
FIG. 1 is a fragmentary plan view of a metal sheathed heater showing an opening formed therein.
Figure 4:
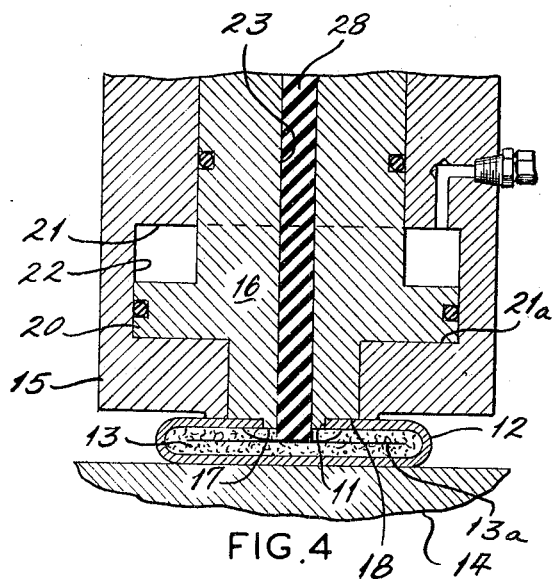
FIG. 4 is an enlarged fragmentary view showing the structure of a portion of FIG. 3 with an extrudable rod positioned in the center opening of the device.
Figure 2:
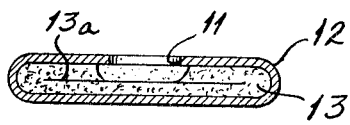
FIG. 2 is a vertical sectional view taken along line 2—2 of FIG. 1.

FIGS. 1 and 2 show a section of an electrical resistance heater 10 with an opening 11 formed in the top surface of the metal sheath 12 and extending into the packed magnesium oxide filler 13 to an electrical resistance heating element 13a enclosed in the filler 13. The opening 11 normally is formed by drilling which creates a burr on the inner edge of the opening 11 in the sheath 12. The filler 13 is removed from beneath the edges of the sheath 12 to provide a space for receiving extruded material to initiate forming a lip about the opening 11.

Figure 3:
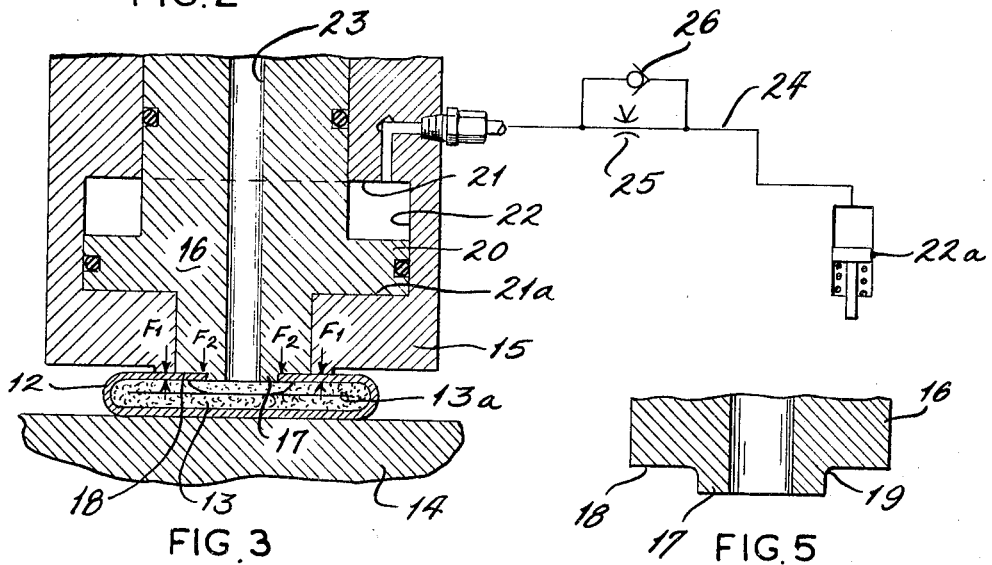
FIG. 3 is a fragmentary view schematically showing the forces applied and a representative showing of a suitable mechanism for so applying said forces to a sheet metal structure illustrated as a sheathed metal heater for purposes of illustrating the present invention.
Figure 5:
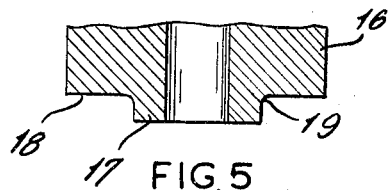
FIG. 5 is a fargmentary enlarged view of the ram showing a radiused seal edge.

In FIG. 3 the heater 10 is placed in a press which comprises a bottom member 14 and a top member 15 positioned thereagainst. Reciprocally mounted in the upper press member 15 is a ram 16 which has a projecting nose portion 17 joined to a shoulder 18 on the bottom surface of the ram 16 by a curved or radiused corner 19 (FIG. 5). The radiused corner 19 helps to seal against the edge of the sheath metal opening 11.

The ram 16 is provided with a flange 20 which moves between opposed surfaces 21 and 21a which define an internal cylinder 22 in the press 15. The ram 16 also is provided with a center passage 23. The cylinder 22 in the press 15 is connected to a source of hydraulic pressure 22a by a conduit 24 which has a bleeder valve 25 and a ball-check valve 26 between the pressure source 22a and the cylinder 22. The ball-check valve 26 is used to by pass the bleeder valve 25 to return the ram 16 to its starting position.

A source of pressure (not shown) is provided for the center passage 23 and a source of pressure (not shown) urges the top press member 15 itself against the metal sheath 12. The center opening 23 is adapted to receive an extrudable rod or column 28 when the press is used.

Operation

Figure 8:
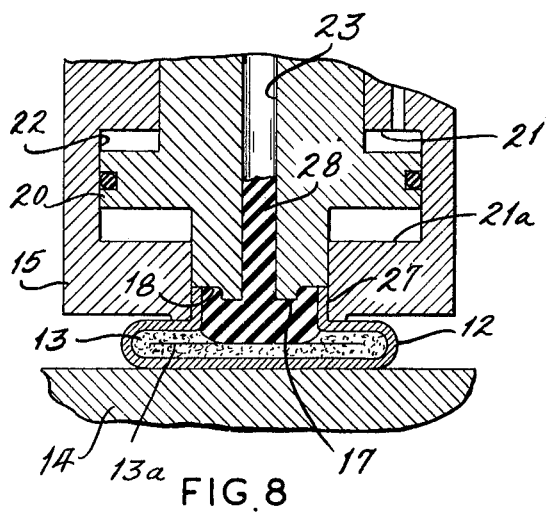
FIG. 8 shows the flange formed.
Figure 9:
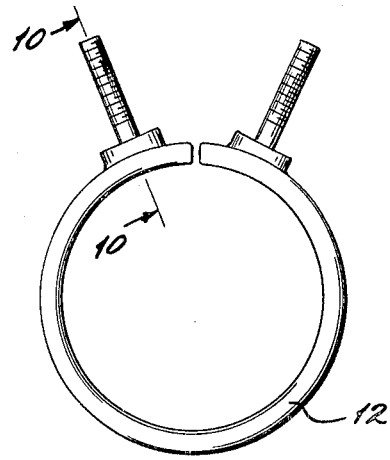
FIG. 9 is a view showing the present invention applied to a curved surface.
Figure 10:
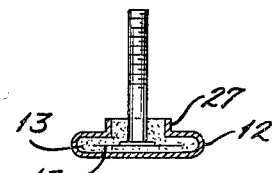
FIG. 10 is a sectional view taken along line 10—10 of FIG. 9.
Figure 11:
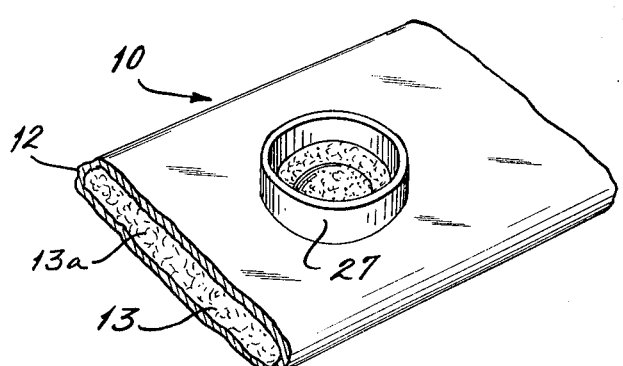
FIG. 11 is a perspective fragmentary view of the heater.

As may be seen in FIG. 5, the upper press member 15 applies a first sealing force ($F_1$) against the upper surface of the metal sheath 12 at a circular line spaced outwardly from the opening 11. The distance between the opening 11 and the line of application of the force $F_1$ defines the heighth of the flange 27 (FIG. 8) which will ultimately be formed on the sheath 12. The force $F_1$ compresses the sheath 12 against the filler 13 to prevent the plastic rod 28 from being extruded therebetween. This force $F_1$ preferably is mechanically applied and is locked in place to react to a force of great magnitude.

A second force ($F_2$) is applied by means of the fluid in the cylinder 22 acting on the ram 16 which engages the edge of the opening 11 to seal the opening 11, so as to prevent any material from the column 28 being extruded between said edge and the ram shoulder 18. As the column 28 is extruded into the opening 11, the ram is slowly moved upwardly as the fluid is released through the bleeder valve 25 to allow the flange 27 to raise and be formed. However, a sealing force still is maintained between the edge of the opening 11 and the end of the ram 16. The force $F_2$ initially is of small magnitude, i.e., about 12 pounds but again because of the restricted orifice 25, the force $F_2$ increases as reactive pressure is applied from the extruding plastic rod 28 and the bleeding of fluid from the chamber 22 through the valve 25 allows the piston 16 to retract slowly. The initial value of the force $F_2$ is on the fluid in the cylinder 22 and is caused by the spring pressure against the pistons in the cylinder 22a.

Figure 6:
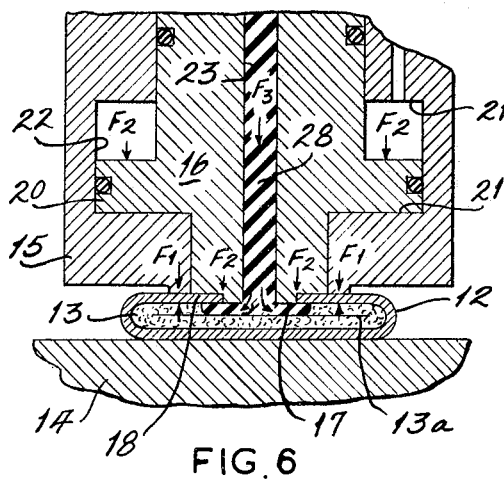
FIG. 6 is a view similar to FIG. 4 showing a portion of the flowable plastic extruded beneath the lips of the opening in the metal sheath.
Figure 7:
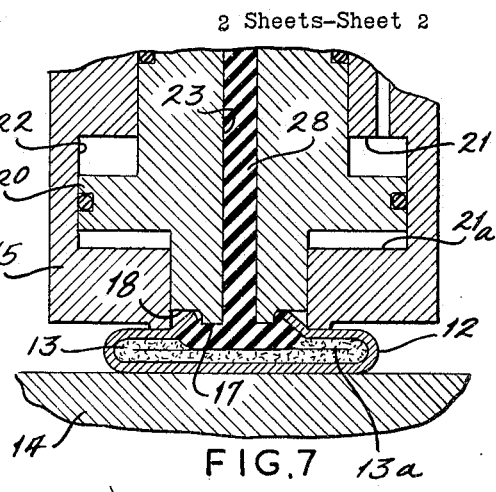
FIG. 7 is a view similar to FIG. 6 showing the flange beginning to form on the opening.

An extrudable rod 28 is positioned in the center opening 23 of the ram 16. A force ($F_3$) is applied to the free end of the rod 28. The force $F_3$ is sufficient to extrude the column 28 beneath the sheet metal edges around the opening 11 as shown in FIGS. 6 and 7. Teflon is preferred for this material because it can be recovered in one piece and does not contaminate the magnesium oxide filler. However, segments of lead and rubber have been used satisfactorily. Teflon has low friction in the column and is extrudable in a column.

The flange 27 is desired on a heater 10 because it provides a base to mount the terminal and provides a cavity to put some type of sealant around the terminal lead. It also reinforces the terminal and prevents breakage of the same. In forming this structure no lubricant is necessary, and this maintains the dielectric properties of the product because lubricant tends to cause insulation breakdown. However, this is a dry process not involving lubricant. Also, there are no shearing stresses involved. All forces involved are bending stresses so that the unit is uniformly stressed providing a uniform wall thickness on the flange 27.

Using a compacted grain filler 13, when one drills into the metal casing 12 to form the opening 11, the grain beneath the opening 11 is loosened. However, using this process, the force which is exerted on the heater and into the grain repacks the grain to give better insulation and dielectric properties.

Among the critical features of the invention are that there are two seal areas involved. The first seal area is defined by the press member 15 at a line spaced from the opening 11 and this must be sufficiently strong to keep the extrudable material from the rod 28 from passing under the metal cover 12 past this point.

The force $F_2$ seals the line around the edge of the opening 11 to keep the extrudable material from the rod 28 from passing over the top of the sheet metal 12. There must also be sufficient pressure on the plastic rod 28 to bend the metal around the opening 11 into the projection 27. The pressure necessary, of course, depends on the thickness and ductility of the metal in the heater cover 12. Also, the fluid backing the ram 16 must be gradually released as the rod 28 flows to allow the flange 27 to be formed around the opening 11. The material from which the heater is made, that is, the filler material 13, must be able to resist pressure sufficiently to avoid deforming the entire structure. Compacted magnesium oxide is very satisfactory for this purpose.

In operation, the piece of a plastic rod 28 is inserted through the center opening 23 in the ram 16 until it engages the top of the insulation 13 of the heater 10. Pressure is applied to the rod 28, to the ram 16, and to the press 15.

The plastic rod 28 extrudes beneath the end 17 of the ram 16 and also into the space between the metal cover 12 and the insulation 13 around the opening 11. As this occurs, the rim of the opening 11 is moved upwardly as ram 16 is allowed to retract by the back pressure fluid in the chamber 22 escaping through the bleeder valve 25. The edge of the opening 11 and the curve 19 of the ram 16 maintain a sealing engagement at all times to prevent escape of the plastic over the top of the sheath 12. Plastic soon fills the opening and forms the rim upwardly against the side of the press 15. When the pressure is released, the plastic is pulled from the opening 11 and the finished heating element is removed from the press members 14 and 15.

This method also works on curved surfaces and a ½ inch outside diameter ring has been raised ⅛ inch high on a curved surface of 3 inches in diameter using a curved reactive press member 14. The wall thickness is 0.028 inch and the heater material is Incoloy 800, which is a high nickel alloy. About 1275 lbs. pressure has been used on a 3/16 inch Teflon rod in forming such a material.

Thus it is seen that the present invention achieves all of the objects and advantages sought therefor.

This invention is intended to cover all changes and modifications of the example of the invention herein chosen for purposes of the disclosure, which do not constitute departures from the spirit and scope of the invention.

What I claim is:

1. A method of forming a flange around an opening in sheet metal from one side using only reacting force on the other side comprising the steps of:
    (a) forming an opening in a sheet metal member,
    (b) applying a first force on the working side of the sheet metal at a line around the opening and spaced therefrom,
    (c) applying a reactive force to the opposite side of the member,
    (d) applying a second force near the lip of the opening,
    (e) forcing a flowable material under the sheet metal adjacent to the opening, and
    (f) bending the sheet metal adjacent to the opening against the second force.

2. The method of claim 1 wherein the second force seals against the lip of the opening to prevent escape of the flowable material.

3. The method of claim 1 wherein the first force seals at its line of engagement with the sheet metal to prevent flow of flowable material therepast and the flange is formed at this line.

4. The method of claim 3 wherein the second force seals around the lip of the opening to prevent escape of the flowable material.

5. The method of claim 1 wherein the flowable material is tetrafluoroethylene.

6. The method of claim 1 wherein the sheet metal is a side of a sheathed electrical resistance heater.

7. A method of forming a flange around an opening in the metal sheath of a sheathed resistance heater having a resistance heating element enclosed in compacted granular insulating material inside of the metal sheath comprising the steps of:
    (a) forming an opening in the metal sheath and into the granular filler,
    (b) applying a first force on the outside side of the metal sheath at a line around the opening and spaced therefrom to urge the sheath against the granular filler,
    (c) removing a portion of the granular filler adjacent to the underside of the sheath around the opening in the sheath, (d) applying a second force to the metal sheath near the lip of the opening, (e) forcing a flowable material under the sheath adjacent to the opening, and (f) bending the metal in the sheath adjacent to the opening into a flange around the opening by slowly withdrawing the second force.

8. The method of claim 7 wherein the flowable material is tetrafluoroethylene.

References Cited

UNITED STATES PATENTS

| | | | |
|---|---|---|---|
| 2,966,873 | 1/1961 | Hoffman et al. | 72—57 |
| 3,121,944 | 2/1964 | Karau | 72—57 |

WILLIAM I. BROOKS, Primary Examiner

U.S. Cl. X.R.

29—613; 72—57